(12) United States Patent
Du

(10) Patent No.: US 8,081,752 B2
(45) Date of Patent: Dec. 20, 2011

(54) METHOD AND APPARATUS FOR REDUCING CROSSTALK BETWEEN DIGITAL SUBSCRIBER LINES

(75) Inventor: Bin Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 754 days.

(21) Appl. No.: 12/166,043

(22) Filed: Jul. 1, 2008

(65) Prior Publication Data

US 2008/0267391 A1   Oct. 30, 2008

Related U.S. Application Data

(63) Continuation of application No. PCT/CN2006/002598, filed on Sep. 30, 2006.

(30) Foreign Application Priority Data

Sep. 30, 2005   (CN) .......................... 2005 1 0107428

(51) Int. Cl.
*H04J 1/12* (2006.01)
*H04M 9/00* (2006.01)
(52) U.S. Cl. .................... 379/406.06; 370/201; 379/417
(58) Field of Classification Search .......................... None
See application file for complete search history.

(56) References Cited

U.S. PATENT DOCUMENTS

| 6,205,220 | B1 | 3/2001 | Jacobsen et al. |
| 6,999,583 | B2 | 2/2006 | Valenti et al. |
| 2002/0041657 | A1 | 4/2002 | Ulanskas et al. |
| 2003/0198217 | A1* | 10/2003 | Redfern .......................... 370/352 |
| 2003/0223482 | A1 | 12/2003 | Oksman et al. |
| 2003/0231603 | A1 | 12/2003 | McClennon et al. |
| 2005/0041782 | A1* | 2/2005 | Qiu .............................. 379/27.01 |

FOREIGN PATENT DOCUMENTS

| CN | 1222276 A | 7/1999 |
| CN | 1250276 A | 4/2000 |
| CN | 1655470 A | 8/2005 |

(Continued)

OTHER PUBLICATIONS

Cendrillon et al., Iterative Spectrum Balancing for Digital Subscriber Lines, IEEE (Communications), 3: 1937-1941 (May 2005).

(Continued)

*Primary Examiner* — Walter F Briney, III
(74) *Attorney, Agent, or Firm* — Leydig, Voit & Mayer, Ltd.

(57) ABSTRACT

A method and apparatus for reducing crosstalk between digital subscriber lines includes: firstly, determining a parameter of VDSL (Very-high-bit-rate Digital Subscriber Line); secondly, determining frequency range of signal to be transmitted in the line and transmitting signal in the corresponding line according to the determined frequency range. This mainly means reducing or turning off the transmitting of the signal at a high frequency band and only using low frequency band for data transmitting in the case that the line parameter exceeds the predetermined threshold, so that crosstalk to neighboring lines is reduced. The present invention can effectively overcome the crosstalk against neighboring lines during the channel discovery phase of digital subscriber line and the transfer performance of the digital subscriber line in operation can be guaranteed. The present invention is realized based on the established standard, so the present invention is simple and easy to implement.

16 Claims, 5 Drawing Sheets

FOREIGN PATENT DOCUMENTS

| | | | |
|---|---|---|---|
| CN | 100426807 | C | 10/2008 |
| CN | 101222242 | B | 1/2011 |
| DE | 100 65 741 | A1 | 7/2002 |
| EP | 0 969 605 | A2 | 1/2000 |
| KR | 2005-0073850 | A | 7/2005 |
| WO | WO 01/35610 | A1 | 5/2001 |
| WO | WO 02/058315 | A1 | 7/2002 |

OTHER PUBLICATIONS

Written Opinion of the International Searching Authority in corresponding PCT Application No. PCT/CN2006/002598 (Feb. 8, 2007).

$1^{st}$ Office Action in corresponding Chinese Application No. 200510107428.7 (May 25, 2007).

$1^{st}$ Office Action in corresponding Chinese Application No. 200710153072.X (Mar. 29, 2010).

Brown, "G.vdsl: Draft text for VDSL2—version 3.1," Editor for G.vdsl, May 16-27, 2005, Texas Instruments Inc., Geneva Switzerland.

"G.994.1—Handshake procedures for digital subscriber (DSL) transceivers," Series G: Transmission Systems and Media, Digital Systems and Networks, May 2003, International Telecommunication Union, Geneva, Switzerland.

* cited by examiner

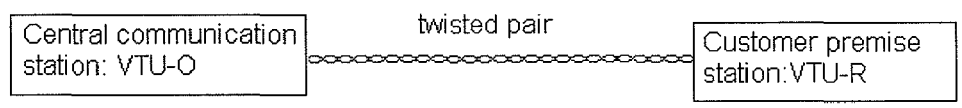
Figure 1
| U0 | DS1 | US1 | DS2 | US2 |
$f_{0L}$ $f_{0H}$      3.75      5.2      8.5      12
Figure 2
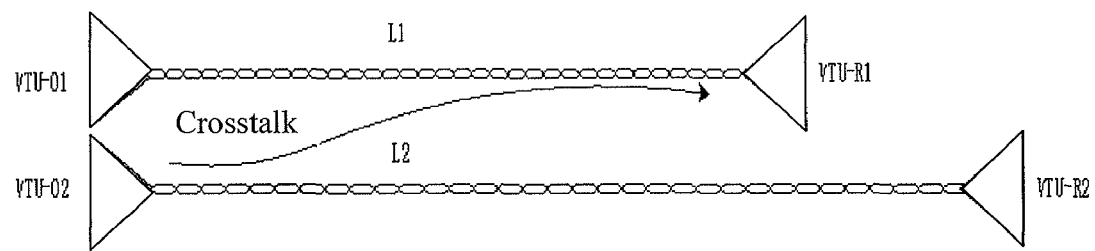
Figure 3

METHOD AND APPARATUS FOR REDUCING CROSSTALK BETWEEN DIGITAL SUBSCRIBER LINES

CROSS-REFERENCE TO RELATED APPLICATIONS

This application is a continuation of International Patent Application No. PCT/CN2006/002598, filed Sep. 30, 2006, which claims priority to Chinese Patent Application No. 200510107428.7, filed Sep. 30, 2005, both of which are hereby incorporated by reference in their entirety.

FIELD OF TECHNOLOGY

The present invention relates to network communication technologies, and in particular to a method and apparatus for reducing the crosstalk between digital subscriber lines.

BACKGROUND OF THE PRESENT INVENTION xDSL technology is a technology which provides high bit-rate data transfer on unshielded twist pairs which is used for telephone. xDSL technology may include standards of Very-High-Bit-Rate Digital Subscriber Line (VDSL) and Second Generation of VDSL (VDSL2), and future standards such as Third Generation of VDSL (VDSL3), Multi-input multi-output VDSL (MIMO-VDSL) and Vectored DSL.

FIG. 1 illustrates VDSL system structure. The VDSL system includes a communication station 1 at central office which is named VTU-O and a communication station 2 at the remote side which is named VTU-R. The Communication station 1 and the communication station 2 communicate via a loop. The signal from station 1 to station 2 is called downlink signal and the signal on the opposite direction is called uplink signal. Station 1 and Station 2 may respectively support multiple modes for operation and each mode uses different frequency band.

VDSL channels vary with regions, and normally a region contains 4-6 channels. FIG. 2 shows an example of a regional frequency plan. According to this frequency plan 2-3 downlink channels and 2-3 uplink channels are provided. The starting frequency of the second downlink channel (DS2) is usually above 5.2 MHz.

FIG. 3 illustrates a scenario in VDSL system. In this scenario, two or more VDSL lines between stations are adjacent to each other in a bundle of lines. According to signal processing theories, crosstalk between loops increases with the increase on frequency. So, in the scenario showed in FIG. 3, crosstalk occurs between two lines. The crosstalk may be more serious in VDSL because VDSL uses a higher frequency.

When VTU-O1 and VTU-R1 are in operation, some processes will be adopted to reduce the crosstalk between VDSL lines. If the length L1 of the Line 1 is relatively short and the configured operating rate is relatively low, for example, a line with the length of 300 m is only configured as 20 Mbps in downlink while attainable rate in downlink of the line may be up to 80 Mbps., the process may be adopted that the power at each frequency point is reduced so as to decrease the system power consumption. In this way, the downlink transmit power of VTU-O1 may be much lower than the rated power. Thus the crosstalk between lines may be reduced to some extent.

In VDSL system, besides the crosstalk may be caused between neighboring lines which are in normal operation state, serious crosstalk may also be caused by the VSDL lines which are in initialization process to neighboring lines, affecting the transmission performance of the VDSL lines in transmitting data.

According to VDSL2 draft standard, the initialization procedure contains 5 phases which are illustrated below in table 1.

TABLE 1

| G.994.1 Handshake | Channel Discovery | Training | Channel analysis | Exchange |
|---|---|---|---|---|

During channel discovery phase, central communication station VTU-O firstly sends O-P-Channel-Discovery signal. According to VDSL2 standard, the O-P-Channel-Discovery signal almost covers all the frequency points of each channel (such as the DS1 and DS2 as shown in FIG. 2), and transmit power of the signal is confined as below the rated power.

During the channel discovery phase, situations with the actual transmit power of the O-P-Channel-Discovery signal mainly include:

(1) The O-P-Channel-Discovery signal is directly transmitted that is not treated with DPBO (downlink power back-off);

(2) If the length of line 2 is pretty long, for example, the length is 1.5 km. In this case, even DPBO is enabled; the downlink O-P-Channel-Discovery signal will not be treated with DPBO according to the VDSL2 standard.

So, the O-P-Channel-Discovery signal is sometimes transmitted by a power close to rated power and the long line L2 of FIG. 3 causes a serious crosstalk upon the high frequency signal of the short line L1.

Assuming the short line L1 is 200 m, O-P-Channel-Discovery signal is transmitted over the long line L2 at rated power, the frequency plan in FIG. 2 is adopted, i.e., DS1 from 138 KHz to 3.75 MHz, and DS2 from 5.2 MHz to 8.5 MHz; the crosstalk from L2 to L1 is shown in FIG. 4. According to FIG. 4, during the channel-discovery phase of the long line, the crosstalk of the DS2 frequency band of the short line is very serious, and at some frequencies the crosstalk power is even higher than the signal power of the short line. This may impose a great impact on the transfer performance of the short line in transferring data. For example, the bit error rate may increase seriously.

SUMMARY OF THE INVENTION

The present invention is directed to provide a method and apparatus for overcoming the crosstalk of the O-P-Channel-Discovery signal and subsequent downlink signals against neighboring lines, to reduce the crosstalk of VDSL lines. The present invention may effectively reduce the crosstalk of a line to its neighboring lines during the phase of channel discovery of the line, and the reliability of the data transfer in the neighboring lines may be effectively guaranteed.

The objectives of the present invention are achieved by the following technical solutions.

The present invention provides a method for reducing crosstalk between digital subscriber lines, which relates to a central office device, a customer premise device and a line connecting the central device with the customer premise device.

The method includes: obtaining a parameter of the line according to a handshake signal; determining a usable frequency of the line according to the line parameter, and determining signal transmit power or power spectrum density according to the usable frequency; transmitting signal at the usable frequency according to the determined signal transmit power or power spectrum density.

The line parameter may be power level of received subcarriers, and/or frequency response, and/or background noise, and/or a parameter calculated according to the power level of received subcarriers, and/or the frequency response, and/or the background noise.

The handshake signal is a handshake signal defined in G.994.1.

If the line parameter is electric length of the line, the obtaining a line parameter according to a handshake signal includes: calculating the electric length of the line according to the power level of received subcarriers during the handshake phase; or obtaining the electric length of the line by means of a line test instrument.

The determining a usable frequency includes: determining a frequency range of transmit signal in corresponding lines during channel discovery phase, training phase and/or channel analysis phase according to the electric length of the line.

The method further includes: if the line electric length of the line exceeds a predetermined threshold, reducing frequency of uplink signal and/or downlink signal to be transmitted in the line.

The reducing the frequency of uplink signal and/or downlink signal to be transmitted in the line includes: turning off the transmitting of high frequency signal in the line and just transmitting low frequency signal.

The predetermined threshold may be a fixed value or a modifiable threshold.

The present invention further provides a method for reducing crosstalk between digital subscriber lines, including: determining parameter of a VDSL line, and determining transmit power of a signal to be transmitted in the line according to the parameter and a corresponding upper limit of transmit power.

The present invention further provides a method for reducing crosstalk between digital subscriber lines, which relates to a central office device, a customer premise device and a line connecting the customer premise device with the central office device.

The method includes: obtaining a parameter of the line according to a handshake signal; determining an unusable frequency of the line according to the obtained parameter of the line, and reducing power or power spectrum density (PSD) of a signal using a frequency in the unusable frequency.

The present invention further provides an apparatus for reducing crosstalk between digital subscribe lines, including: a line parameter calculating module, adapted to calculate and determine a line parameter of the line; and a transmit signal processing module, adapted to determine the frequency range of signal to be transmitted according to the determined parameter of the line and transmit a signal of corresponding frequency.

The apparatus further includes: a signal processing triggering module, adapted to trigger the transmit signal processing module during handshake phase, channel discovery phase training phase and/or channel analysis phase. The apparatus is arranged in the central office device and/or the remote customer premise device of digital subscriber line.

It is easy to find that by the technical solutions provided by the present invention, VDSL crosstalk to neighboring lines during channel discovery phase may be effectively overcome and the transfer performance of the VDSL lines in transferring data may be guaranteed. At the same time, the implementation of the invention is based on the established standard, so the present invention is simple and easy to implement.

BRIEF DESCRIPTION OF THE DRAWINGS

FIG. 1 illustrates a structure of a VDSL2 system;
FIG. 2 illustrates a schematic diagram of a VDSL channel allocation;
FIG. 3 illustrates a schematic diagram of crosstalk generated in a VDSL2 system.

EMBODIMENTS OF THE INVENTION

Figure 4:
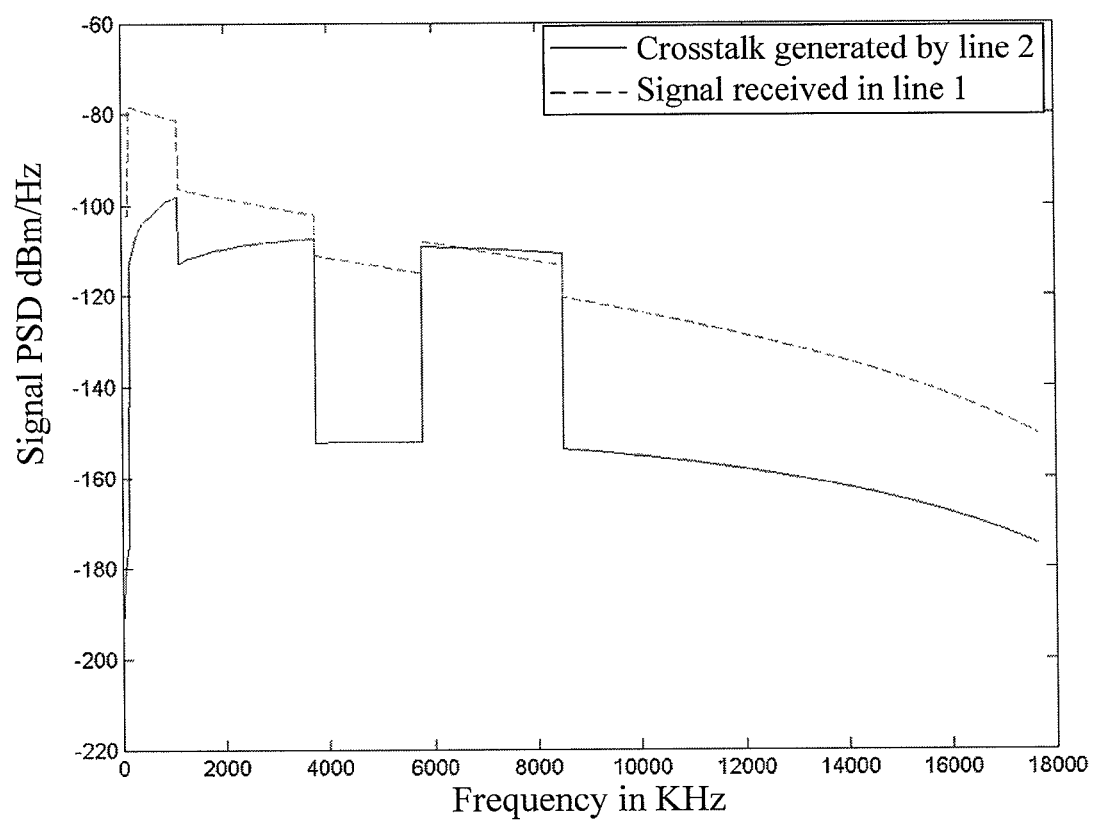
FIG. 4 illustrates a schematic diagram of the amount of crosstalk in the scenario shown in FIG. 3.
Figure 5:
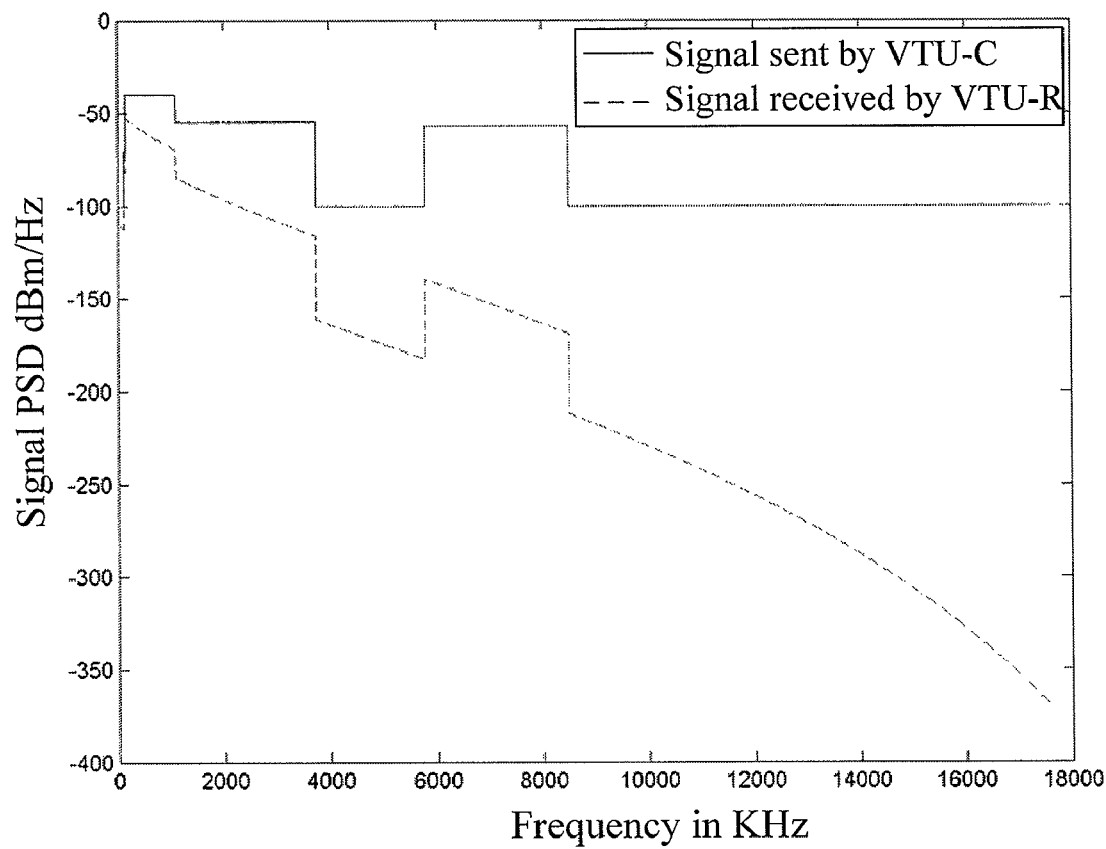
FIG. 5 illustrates a schematic diagram of signal power in case that a VDSL line is pretty long.

According to the theory of signal processing, the line attenuation increases in line with the increase on length. Considering a twisted pair having a 1100-meter length and a 0.4 mm diameter without any bridge tap, 20.5 dBm of transmit power in downlink may be used by VTU-C, and the received signal at VTU-R is illustrated in FIG. 5. According to FIG. 5, the PSD of DS2 channel (downlink channel) is below −140 dBm/Hz at 1100 meter long, and the noise received by the VTU-R is usually −140 dBm/Hz. Because the power of the signal is on the same level with that of the noise, the DS2 frequency band may not be used to transfer data. So the high frequency band can be turned off.

The present invention processes downlink signals based on such a mechanism as the above-mentioned to reduce the crosstalk between digital subscribe lines. With the same mechanism, the present invention may also be applied to process uplink signals.

One embodiment of the present invention includes a central office device, a customer premise device and a line connecting the customer premise device with the central office device, specifically including:

Firstly, a parameter of the line is obtained according to a handshake signal; the parameter of the line is at least one of the flowing: power level of received subcarriers, frequency response and background noise, and/or, the parameter of the line is the parameter calculated according to the power level of received subcarriers and/or the frequency response and/or the background noise, for example, the parameter of the line may be electric length of the line; the handshake signal may be a handshake signal defined by G.994.1;

Secondly, the usable frequency of the line is determined according to the obtained parameter of the line, and the power or PSD of transmit signal is determined according to the usable frequency;

Finally, signals are transmit at the usable frequency band according to the determined power or PSD of transmit signal.

In present invention, after the parameter of the line is obtained from the handshake signal, the central office device or the remote customer premise device may further determine the unusable frequency of the line according to the obtained parameter of the line and reduce high frequency crosstalk by reducing the transmit power or PSD of the signal using the frequency in the unusable frequency.

In the present invention, after the line parameter corresponding to each digital subscriber line is determined, the transmit power in the line may be determined according to the line parameter and the corresponding upper limit of transmit power, so as to avoid the high frequency crosstalk in the line. For example, customer premise device sets different upper limits of rated transmit power for different line parameter, and controls the transmit power based on the configured upper limit to control the crosstalk.

Figure 6:
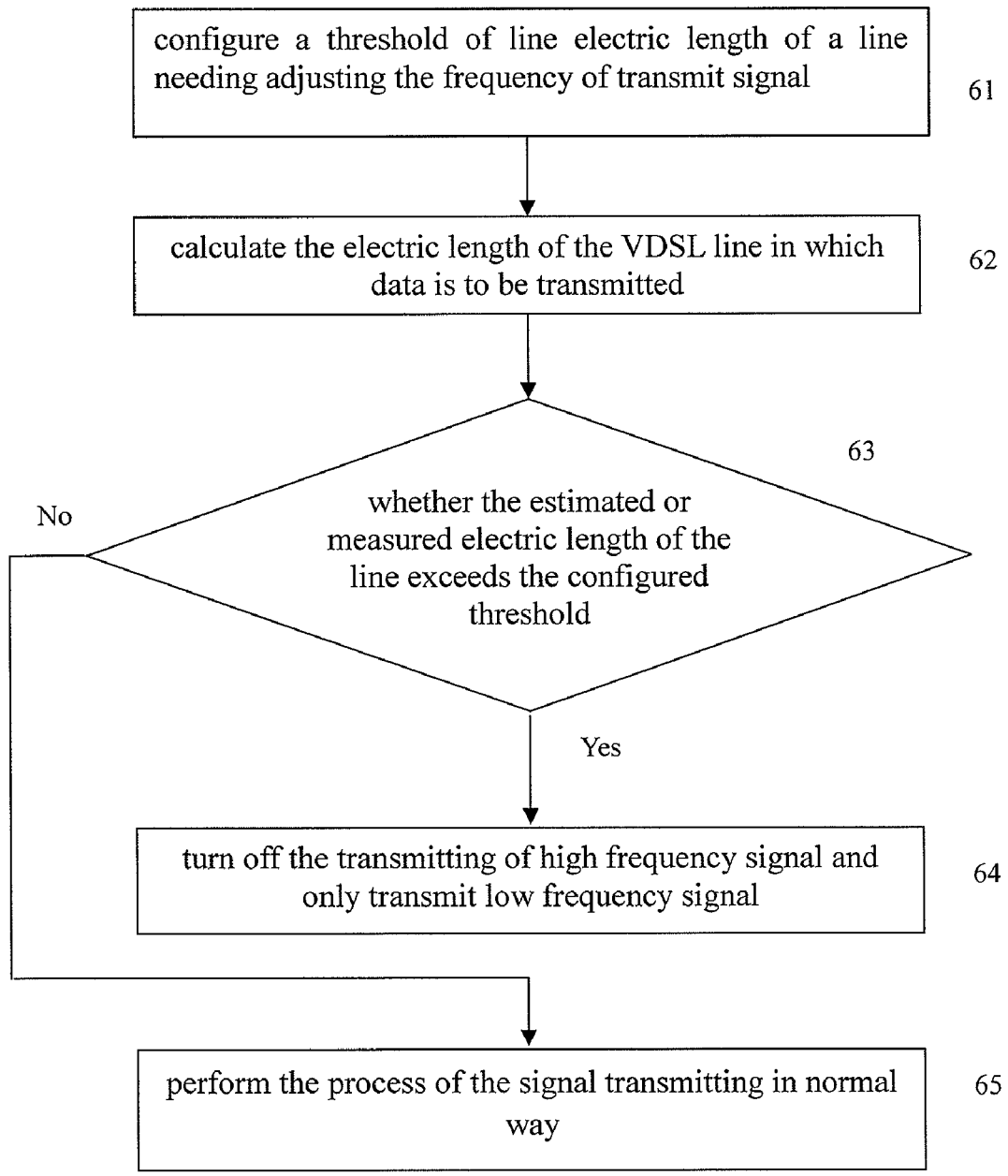
FIG. 6 illustrates a flow chart of a method embodiment of the present invention.

Hereafter, with the appended figures, the parameter of line electric length is taken as an example to describe the method embodiment of how to reduce the crosstalk between digital subscriber lines, so as to reduce high frequency crosstalk of VDSL. As shown in FIG. 6, the method includes the following steps:

Step 61: configure a threshold of line electric length for a line needing adjusting the frequency of transmit signal;

Step 62: calculate the electric length of the VDSL line in which data is to be transmitted.

Firstly, the electric length of the line may be obtained by, but not limited to, two different methods. Such two methods are given as follow:

Method 1, during G.994.1 handshake phase, the VTU-O and/or VTU-R estimates the line's electric length according to the received power level of handshake tones;

Method 2, measure the electric length of the line by means of a test instrument.

Step 63: determine whether the estimated or measured electric length of the line exceeds the configured threshold. If yes, implement step 64; otherwise, implement step 65;

Step 64: reduce the frequency of transmitting signal in the VDSL line, such as turn off the transmitting of high frequency signals and only transmit low frequency signals, to reduce high frequency crosstalk;

At the beginning of channel discovery, the VTU-O or the VTU-R may estimate the electric length of the line and compare it with a fixed threshold or a threshold predetermined by operator in a network management system. For example, assuming the threshold is 1.1 km, if the electric length of the line is equal to or above the threshold of the electric length, high frequency signals of the DS2 are no longer suitable for data transfer. So, for the O-P-Channel Discovery and subsequent downlink signals, the signal transmitting of the DS2 channel can be turned off to effectively reduce crosstalk between lines.

Such a method can also be implemented in the processing of uplink signal: at the beginning of channel discovery, the VTU-O or the VTU-R may estimate the electric length of the line and compare it with a fixed threshold (for example, 1 km) or a threshold preconfigured by an operator in a network management system. If the electric length of the line exceeds such a threshold, US2 (uplink channel) is no longer usable for data transfer. In such a case, the transmitting upon the US2 channel can be turned off to effectively reduce 1 crosstalk between lines.

Step 65: perform the process of the signal transmitting in normal way;

For example, signals are transmitted after the process of power cutting. The detailed method may include:

In downlink, when the electric length of the line is below the threshold, current DPBO (downlink power reducing) may take effect significantly; the transmit power may be below the rated power and crosstalk between lines may be reduced correspondingly.

In uplink, when the electric length of the line is below the threshold, current UPBO (uplink power reducing) may take effect significantly; the transmit power may be below the rated power and crosstalk between lines may be reduced correspondingly.

In present invention, when the line parameter is selected from at least one of following parameters: power level of received subcarriers, frequency response and background noise, and/or the parameter calculated according to the power level of received subcarriers and/or the frequency response and/or the background noise, the corresponding process method is similar to the procedure shown in step 61 through step 65. When the line parameter does not satisfy the requirement of corresponding threshold (for example, exceed the threshold), the transmit power of signal in the line will be adjusted to reduce high frequency crosstalk in the line. The detailed implementation is illustrated in FIG. 6.

In addition, the above-mentioned implementation in channel discovery phase of VDSL line is only an embodiment example of present invention, and the present invention can also be applied to other phases of VDSL initialization, such as training phase and/or channel analysis phase, etc.

With the present invention, different upper limits of rated transmit power corresponding to each line electric length respectively can be configured, and the transmit power for transmitting signal can be controlled according to the configured upper limit of rated transmit power to control the line crosstalk.

The method and apparatus described in present invention may also be applied to other DSL technologies to reduce crosstalk with similar approach as used in controlling VDSL high frequency crosstalk so as to omit the detailed description.

An apparatus for reducing the crosstalk between DSL lines is also disclosed in the present invention. The apparatus is arranged in a central office device and/or a remote customer premise device.

Figure 7:
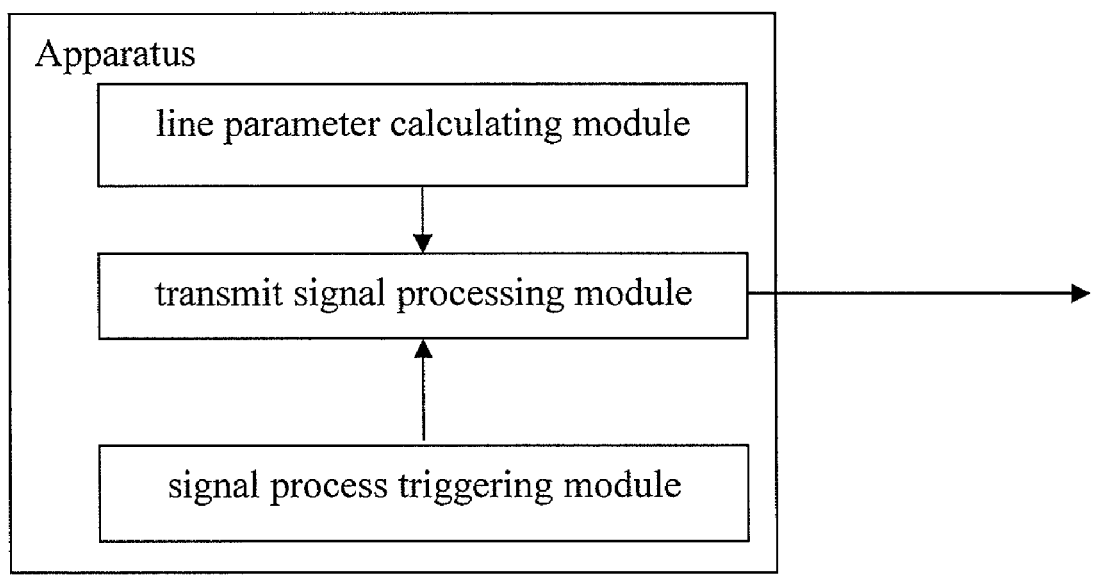
FIG. 7 illustrates a schematic diagram of the apparatus of the present invention.

The apparatus includes following modules and is illustrated in FIG. 7:

a line parameter calculating module, adapted to calculate and determine one or more line parameters such as electric length. Preferably, the line parameter calculating module may calculate the one or more line parameters based on power level of received subcarriers, or estimate the one or more line parameters by means of a test instrument.

a transmit signal processing module, adapted to determine the frequency range of transmit signal according to the determined one or more line parameters of the line and transmit signals of corresponding frequency. The criterion for transmitting is that, if a parameter exceeds predetermined threshold, turn off the transmitting of the signal at a high frequency band and transmit the signals at a low frequency band.

a signal process triggering module, adapted to trigger the transmit signal processing module during channel discovery phase, training phase and/or channel analysis phase, so as to adjust the transmit frequency in corresponding phase, to reduce the line crosstalk.

It can be summarized according to the above-described that the present invention can reduce the crosstalk from a line to its neighboring lines that is generated by uplink and downlink signal in channel discovery phase in the line. The present invention is based on the established standard, so it is simple and easy to implement.

The above are only exemplary embodiments of the present invention and are not for use in limiting the protection scope thereof. Any modification, equivalent replacement or improvement made by a skilled person in the art under the spirit and principles of the present invention is included in the scope of the claims of the present invention. Protection scope of the invention shall be subject to the claims' protection scope.

What is claimed is:

1. A method for reducing crosstalk between digital subscriber lines, which relates to a central office device, a customer premise device and a line connecting the central office device with the customer premise device, comprising:

obtaining a parameter of the line according to a handshake signal;

determining a usable frequency of the line according to the parameter of the line, wherein the usable frequency comprises a usable frequency of transmit signal during a channel discovery phase;

determining signal transmit power or power spectrum density according to the usable frequency of the line; and transmitting signal at the usable frequency according to the determined signal transmit power or power spectrum density.

2. The method according to claim 1, wherein the parameter of the line comprises:

at least one of power level of received subcarriers, frequency response, background noise, a parameter calculated according to the power level of the received subcarriers, the frequency response, and the background noise.

3. The method according to claim 1, characterized in that, the handshake signal is a handshake signal defined in G.994.1.

4. The method according to claim 1, wherein if the parameter of the line is electric length of the line, the obtaining the parameter of the line according to the handshake signal further comprises:

calculating the line electric length of the line according to received power level of handshake tones during the handshake phase.

5. The method according to claim 4, wherein the determining the usable frequency of the line further comprises:

determining a frequency range of transmit signal in corresponding line according to the line electric length of the line.

6. The method according to of claim 4, characterized by further comprising:

if the line electric length of the line exceeds a predetermined threshold, reducing frequency of uplink signal and/or downlink signal to be transmitted in the line.

7. The method according to claim 6, characterized in that, the reducing the frequency of uplink signal and/or downlink signal to be transmitted in the line comprises:

turning off the transmitting of high frequency signal in the line and just transmitting low frequency signal.

8. The method according to claim 6, characterized in that, the predetermined threshold is a fixed value or a modifiable threshold.

9. A method for reducing crosstalk between digital subscriber lines, which relates to a central office device, a customer premise device and a line connecting the customer premise device with the central office device, comprising:

obtaining a parameter of the line according to a handshake signal;

determining an unusable frequency of the line according to the obtained parameter of the line, wherein the unusable frequency comprises an unusable frequency of transmit signal during a channel discovery phase;

and reducing power or power spectrum density of a signal in the unusable frequency of the line.

10. The method according to claim 9, wherein the parameter of the line comprises:

at least one of power level of received subcarriers, frequency response, background noise, a parameter calculated according to the power level of the received subcarriers, the frequency response, and the background noise.

11. The method according to claim 10, wherein the unusable frequency further comprises an unusable frequency of transmit signal during at least one of a training phase and a channel analysis phase.

12. The method according to claim 9, wherein if the parameter of the line is electric length of the line, the obtaining the parameter of the line according to the handshake signal further comprises:

calculating the line electric length of the line according to the received power level of handshake tones during a handshake phase.

13. An apparatus for reducing crosstalk between digital subscriber lines, comprising:

a line parameter calculating module, adapted to calculate and determine a line parameter of a line, according to received power level of handshake tones during a handshake phase;

a transmit signal processing module, adapted to determine a frequency range of signal to be transmitted according to the determined line parameter of the line and transmit a signal of corresponding frequency; and a signal process triggering module, adapted to trigger the transmit signal processing module during a channel discovery phase.

14. The apparatus according to claim 13, further comprising:

a signal process triggering module, adapted to trigger the transmit signal processing module during at least one of a training phase and a channel analysis phase.

15. The apparatus according to claim 13, characterized in that, the apparatus is arranged in the central office device and/or the remote customer premise device of digital subscriber line.

16. The apparatus according to claim 14, characterized in that, the apparatus is arranged in the central office device and/or the remote customer premise device of digital subscriber line.

* * * * *